United States Patent
Liou et al.

(10) Patent No.: US 11,893,083 B2
(45) Date of Patent: Feb. 6, 2024

(54) ELECTRONIC DEVICE AND METHOD FOR TRAINING OR APPLYING NEURAL NETWORK MODEL

(71) Applicant: Coretronic Corporation, Hsin-Chu (TW)

(72) Inventors: Yi-Fan Liou, Hsin-Chu (TW); Yen-Chun Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 332 days.

(21) Appl. No.: 17/467,453

(22) Filed: Sep. 7, 2021

(65) Prior Publication Data

US 2022/0092350 A1 Mar. 24, 2022

(30) Foreign Application Priority Data

Sep. 23, 2020 (TW) .................. 109132818

(51) Int. Cl.
*G06F 18/214* (2023.01)
*G06N 3/04* (2023.01)

(52) U.S. Cl.
CPC ............. *G06F 18/214* (2023.01); *G06N 3/04* (2013.01)

(58) Field of Classification Search
None
See application file for complete search history.

(56) References Cited

U.S. PATENT DOCUMENTS

| | | | |
|---|---|---|---|
| 10,423,861 B2 | 9/2019 | Gao et al. | |
| 10,599,711 B1* | 3/2020 | Malpani | G06F 16/583 |
| 10,726,326 B2 | 7/2020 | Fukuda et al. | |
| 11,263,782 B2* | 3/2022 | Hwang | G06T 7/90 |
| 11,373,672 B2* | 6/2022 | Mesgarani | G10L 25/30 |
| 11,436,014 B2* | 9/2022 | Qadeer | G06N 3/08 |
| 11,695,898 B2* | 7/2023 | Runia | G06F 30/27 |
| | | | 348/578 |
| 11,703,457 B2* | 7/2023 | Yang | G01S 17/42 |
| | | | 348/125 |

(Continued)

FOREIGN PATENT DOCUMENTS

| | | |
|---|---|---|
| CN | 110222653 | 9/2019 |
| TW | 201917566 | 5/2019 |

(Continued)

OTHER PUBLICATIONS

Yunpeng Chen et al., "Drop an Octave: Reducing Spatial Redundancy in Convolutional Neural Networks with Octave Convolution", arXiv, Aug. 18, 2019, pp. 1-12.

*Primary Examiner* — Anand P Bhatnagar
(74) *Attorney, Agent, or Firm* — JCIPRNET (57) ABSTRACT

An electronic device and a method for training or applying a neural network model are provided. The method includes the following steps. An input data is received. Convolution is performed on the input data to generate a high-frequency feature map and a low-frequency feature map. One of upsampling and downsampling is performed to match a first size of the high-frequency feature map and a second size of the low-frequency feature map. The high-frequency feature map and the low-frequency feature map are concatenated to generate a concatenated data. The concatenated data is inputted to an output layer of the neural network model.

14 Claims, 6 Drawing Sheets

(56) References Cited

U.S. PATENT DOCUMENTS

| | | | | |
|---|---|---|---|---|
| 11,734,006 | B2* | 8/2023 | Qadeer | G06F 17/16 345/559 |
| 2021/0201017 | A1* | 7/2021 | Wakui | G06V 30/274 |
| 2021/0326133 | A1* | 10/2021 | Qadeer | G06N 3/063 |
| 2022/0044113 | A1* | 2/2022 | Wu | G06N 3/08 |
| 2022/0215588 | A1* | 7/2022 | Hwang | G06N 3/084 |
| 2022/0286696 | A1* | 9/2022 | Gao | G06T 3/4046 |
| 2022/0327692 | A1* | 10/2022 | Park | G06T 11/005 |
| 2022/0392482 | A1* | 12/2022 | Mesgarani | G10L 25/30 |
| 2023/0153510 | A1* | 5/2023 | Yang | G06F 30/398 716/52 |

FOREIGN PATENT DOCUMENTS

| | | |
|---|---|---|
| TW | 202028778 | 8/2020 |
| TW | 202030651 | 8/2020 |

* cited by examiner

ELECTRONIC DEVICE AND METHOD FOR TRAINING OR APPLYING NEURAL NETWORK MODEL

CROSS-REFERENCE TO RELATED APPLICATION

This application claims the priority benefit of Taiwan application serial no. 109132818, filed on Sep. 23, 2020. The entirety of the above-mentioned patent application is hereby incorporated by reference herein and made a part of this specification.

BACKGROUND

Technical Field

The disclosure relates to an electronic device and a method, and particularly, to an electronic device and a method for training or applying a neural network model.

Description of Related Art

With the development of artificial intelligence (AI), neural networks have come to be applied to many industries. For example, a factory may adopt a neural network for image recognition and classification to thereby distinguish between good products and defective products among a large number of products.

Among the various neural network architectures, the convolutional neural network (CNN) exhibits good performance in the field of image processing. Through the operation of multiple convolutional layers, the convolutional neural network can generate feature maps representing the salient features of an input image, and then classify the input image according to the feature maps. However, there are some disadvantages to the convolutional neural network. For example, the feature maps generated by the current convolutional neural network cannot effectively distinguish between features of different frequencies.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

Other objectives and advantages of the disclosure can be further understood from the technical features disclosed herein.

To achieve one, part, or all of the above or other objectives, the disclosure provides an electronic device and a method for training or applying a neural network model, which can generate multiple feature maps representing features of different frequencies, so that the training process of a neural network model using these feature maps for training can converge more easily. In addition, the principle for achieving the technical effect of the disclosure lies in that the downsampling of the disclosure utilizes the low-frequency spatial information of the previous layer, so that information can be continuously transmitted to the next layer, and the training process will not be unstable due to discontinuous transmission of the information.

An embodiment of the disclosure provides an electronic device for training or applying a neural network model, including a transceiver, a storage medium, and a processor. The storage medium stores multiple modules and the neural network model. The processor is coupled to the storage medium and the transceiver, and accesses and executes the modules. The modules include a data collection module and a calculation module. The data collection module receives an input data via the transceiver. The calculation module performs convolution on the input data to generate a high-frequency feature map and a low-frequency feature map, performs one of upsampling and downsampling to match a first size of the high-frequency feature map and a second size of the low-frequency feature map, concatenates the high-frequency feature map and the low-frequency feature map to generate a concatenated data, and inputs the concatenated data to an output layer of the neural network model.

In an embodiment of the disclosure, the calculation module performs the downsampling on the high-frequency feature map to match the first size and the second size.

In an embodiment of the disclosure, the calculation module concatenates the high-frequency feature map and the low-frequency feature map in response to matching between the first size the second size to generate the concatenated data.

In an embodiment of the disclosure, the calculation module performs the upsampling on the low-frequency feature map to match the first size and the second size.

In an embodiment of the disclosure, the calculation module concatenates the high-frequency feature map and the low-frequency feature map in response to matching between the first size and the second size to generate the concatenated data.

In an embodiment of the disclosure, the calculation module divides the input data into a high-frequency input data and a low-frequency input data, and performs an XOR operation on a function of the high-frequency input data and a function of the upsampled low-frequency input data to generate the high-frequency feature map.

In an embodiment of the disclosure, the calculation module divides the input data into a high-frequency input data and a low-frequency input data, and performs an XOR operation on a function of the downsampled high-frequency input data and a function of the low-frequency input data to generate the low-frequency feature map.

An embodiment of the disclosure provides a method for training or applying a neural network model, including the following steps. An input data is received. Convolution is performed on the input data to generate a high-frequency feature map and a low-frequency feature map. One of upsampling and downsampling is performed to match a first size of the high-frequency feature map and a second size of the low-frequency feature map. The high-frequency feature map and the low-frequency feature map are catenated to generate a concatenated data. The concatenated data is inputted to an output layer of the neural network model.

In an embodiment of the disclosure, the step of performing one of the upsampling and the downsampling to match the first size of the high-frequency feature map and the second size of the low-frequency feature map includes the following step. The downsampling is performed on the high-frequency feature map to match the first size and the second size.

In an embodiment of the disclosure, the step of concatenating the high-frequency feature map and the low-frequency feature map to generate the concatenated data includes the following step. The high-frequency feature map and the low-frequency feature map are concatenated in response to matching between the first size and the second size to generate the concatenated data.

In an embodiment of the disclosure, the step of performing one of the upsampling and the downsampling to match the first size of the high-frequency feature map and the second size of the low-frequency feature map includes the following step. The upsampling is performed on the low-frequency feature map to match the first size and the second size.

In an embodiment of the disclosure, the step of concatenating the high-frequency feature map and the low-frequency feature map to generate the concatenated data includes the following step. The high-frequency feature map and the low-frequency feature map are concatenated in response to matching between the first size and the second size to generate the concatenated data.

In an embodiment of the disclosure, the step of performing the convolution on the input data to generate the high-frequency feature map and the low-frequency feature map includes the following steps. The input data is divided into a high-frequency input data and a low-frequency input data. An XOR operation is performed on a function of the high-frequency input data and a function of the upsampled low-frequency input data to generate the high-frequency feature map.

In an embodiment of the disclosure, the step of performing the convolution on the input data to generate the high-frequency feature map and the low-frequency feature map includes the following steps. The input data is divided into a high-frequency input data and a low-frequency input data. An XOR operation is performed on a function of the downsampled high-frequency input data and a function of the low-frequency input data to generate the low-frequency feature map.

Based on the above, in the embodiments of the disclosure, the size of the feature maps may be adjusted through upsampling or downsampling to concatenate feature maps of different frequencies and input the concatenated data to the output layer of the neural network model to train the neural network model. Using the concatenated data disclosed in the disclosure to train the neural network model can accelerate the convergence of the training process of the neural network model.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The disclosure provides an electronic device and a method for training or applying a neural network model, which can accelerate the convergence of a training process of a neural network model.

Figure 1:
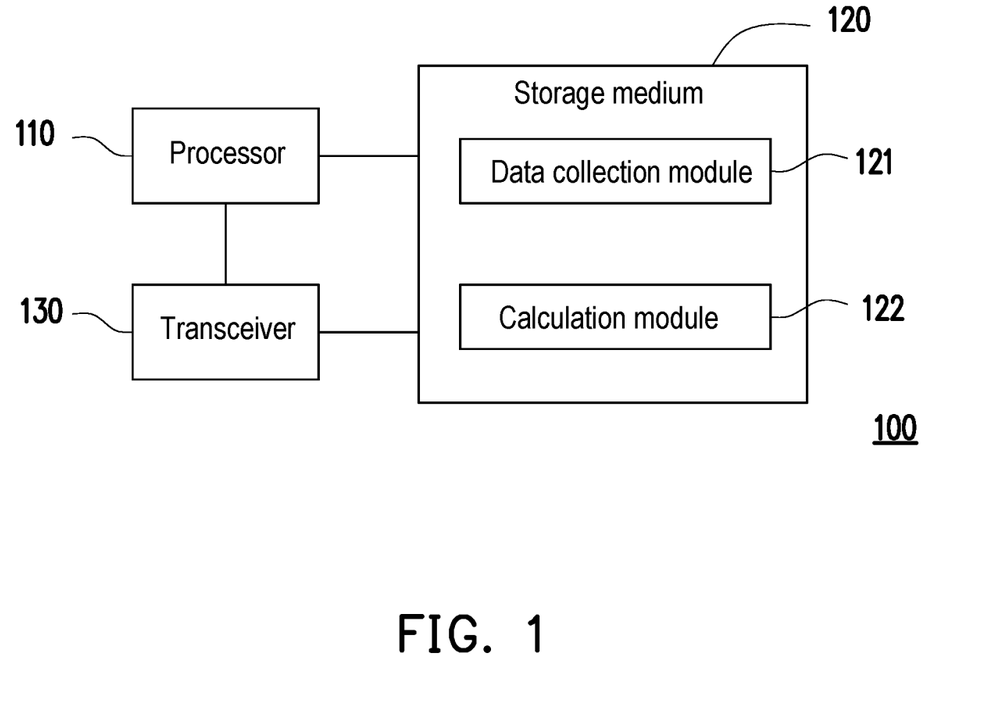
FIG. 1 is a schematic view showing an electronic device for training or applying a neural network model according to an embodiment of the disclosure.

FIG. 1 is a schematic view showing an electronic device 100 for training or applying a neural network model according to an embodiment of the disclosure. The electronic device 100 may include a processor 110, a storage medium 120, and a transceiver 130.

The processor 110 is, for example, a central processing unit (CPU), or other programmable general-purpose or specific-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), other similar devices, or a combination of the above devices. The processor 110 may be coupled to the storage medium 120 and the transceiver 130 and access and execute multiple modules and various applications stored in the storage medium 120.

The storage medium 120 is, for example, a fixed or movable memory in any form, such as a random access memory (RAM), a read-only memory (ROM), a flash memory, a hard disk drive (HDD), a solid state drive (SSD), other similar devices, or a combination of the above devices, and is configured to store multiple modules or various applications that can be executed by the processor 110. In this embodiment, the storage medium 120 may store multiple modules including a data collection module 121 and a calculation module 122, and their functions will be described later. In addition, the storage medium 120 may also store one or more neural network models which have finished training or are still in training.

The transceiver 130 transmits and receives external signals in a wireless or wired manner. The transceiver 130 may also perform operations such as low-noise amplification, impedance matching, frequency mixing, up-down frequency conversion, filtering, amplification, and other similar operations.

The data collection module 121 may receive an input data via the transceiver 130, and the input data may be used to train a neural network model. In other embodiments, the transceiver 130 is electrically connected to the storage medium 120. For example, if the neural network model is trained to recognize an object in an image, the input data is, for example, an image data including at least one object. The data collection module 121 is, for example, software or an application for analyzing/recognizing data.

Figure 2:
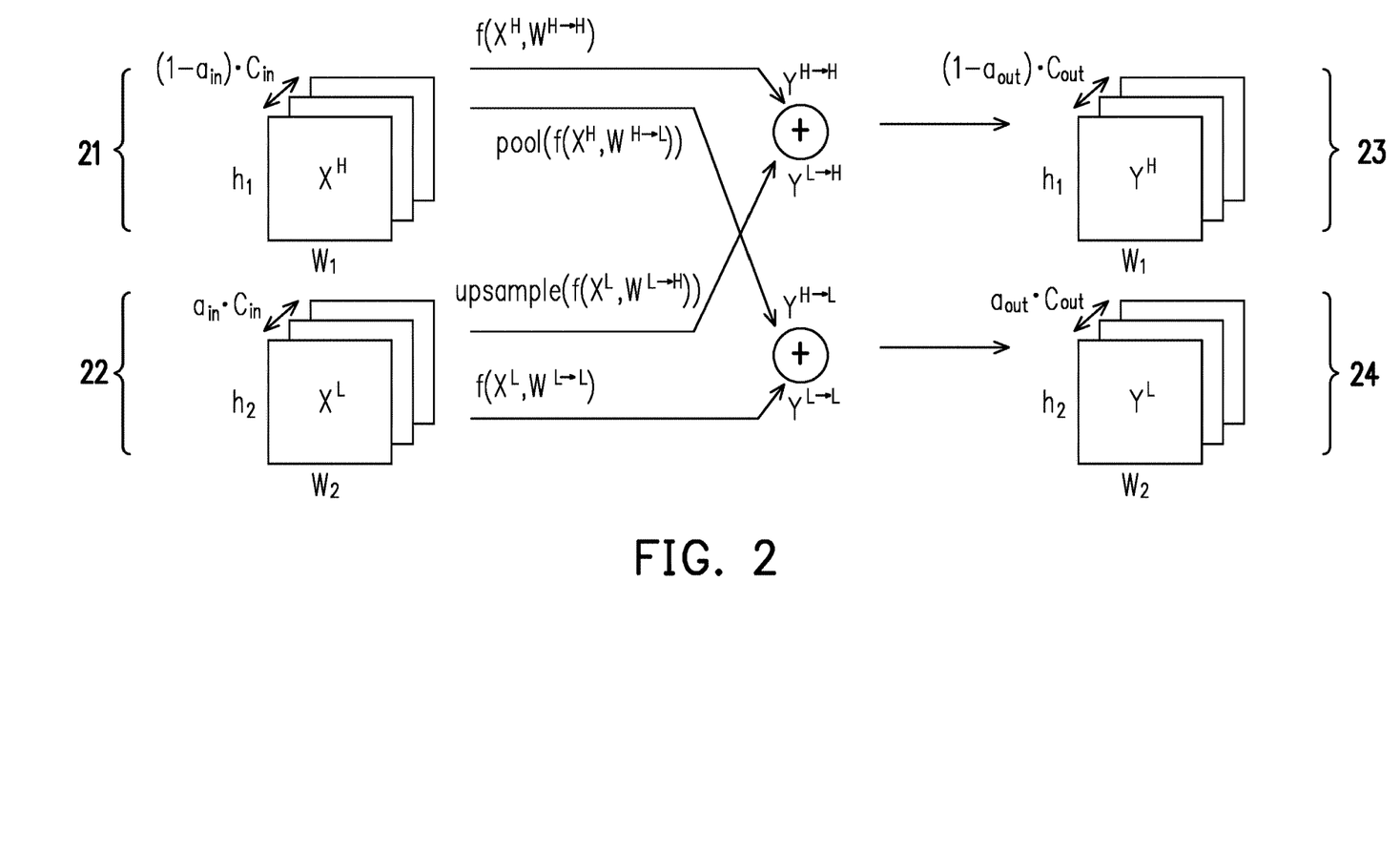
FIG. 2 is a schematic view showing generation of a high-frequency feature map and a low-frequency feature map according to an embodiment of the disclosure.

The calculation module 122 may perform convolution on the input data to generate a high-frequency feature map and a low-frequency feature map for training the neural network model. The calculation module 122 is, for example, software or an application. The input data is inputted to the convolution calculation performed by the calculation module 122 to generate a high-frequency feature map and a low-frequency feature map. FIG. 2 is a schematic view showing generation of a high-frequency feature map and a low-frequency feature map according to an embodiment of the disclosure. Specifically, in the convolutional layer of the neural network model in training, the calculation module 122 may first classify the input data into a high-frequency input data set 21 containing multiple high-frequency input data $X^H$ and a low-frequency input data set 22 containing multiple low-frequency input data $X^L$. The calculation module 122 may configure a parameter $a_{in}$ according to the actual requirements to adjust the quantity of the high-frequency input data $X^H$ in the high-frequency input data set 21 and the quantity of the low-frequency input data $X^L$ in the low-frequency input data set 22, where a parameter $C_{in}$ represents the total quantity of the input data, the parameter $a_{in}$ represents a value between 0 and 1, parameters $h_1$ and $w_1$ represent the sizes of each high-frequency input data $X^H$ in different dimensions, and parameters $h_2$ and $w_2$ represent the sizes of each low-frequency input data $X^L$ in different dimensions. The so-called sizes respectively represent the width (w) and the height (h) of the data array.

The calculation module 122 may perform an XOR operation on a function $f(X^H, W^{H \to H})$ of the high-frequency input data $X^H$ and a function upsample($f(X^L, W^{L \to H})$) of the upsampled low-frequency input data $X^L$ to generate a high-frequency feature map set 23 containing multiple high-frequency feature maps $Y^H$, where a parameter $C_{out}$ represents the total quantity of the feature maps, $W^{H \to H}$ represents the weight of the high-frequency input data $X^H$ used to generate the high-frequency feature map $Y^H$, $W^{L \to H}$ represents the weight of the low-frequency input data $X^L$ used to generate the high-frequency feature map $Y^H$, $Y^{H \to H}$ represents the output of the high-frequency input data $X^H$ after transformation by the weight $W^{H \to H}$, $Y^{L \to H}$ represents the output of the low-frequency input data $X^L$ after transformation by the weight $W^{L \to H}$, and a parameter $a_{out}$ represents a value between 0 and 1.

On the other hand, the calculation module 122 may perform an XOR operation on a function $f(X^L, W^{L \to L})$ of the low-frequency input data $X^L$ and a function pool($f(X^H, W^{H \to L})$) of the downsampled high-frequency input data $X^H$ to generate a low-frequency feature map set 24 containing multiple low-frequency feature maps $Y^L$, where the parameter $C_{out}$ represents the total quantity of the feature maps, $W^{L \to L}$ represents the weight of the low-frequency input data $X^L$ used to generate the low-frequency feature map $Y^L$, $W^{H \to L}$ represents the weight of the high-frequency input data $X^H$ used to generate the low-frequency feature map $Y^L$, $Y^{L \to L}$ represents the output of the low-frequency input data $X^L$ after transformation by the weight $W^{L \to L}$, $Y^{H \to L}$ represents the output of the high-frequency input data $X^H$ after transformation by the weight $W^{H \to L}$, and the parameter $a_{out}$ represents a value between 0 and 1.

In an embodiment, the calculation module 122 may input one or a combination of the high-frequency feature map set 23 and the low-frequency feature map set 24 to the output layer of the neural network model in training to train the neural network model. However, there are some disadvantages to the above approach. For example, if the calculation module 122 only inputs the high-frequency feature map set 23 to the output layer of the neural network model and does not input the low-frequency feature map set 24 to the output layer of the neural network model (i.e., only the high-frequency feature map set 23 is used to train the neural network model, and the low-frequency feature map set 24 is not used to train the neural network model), the trained neural network model will lack low-frequency information of the input data. If the calculation module 122 only inputs the low-frequency feature map set 24 to the output layer of the neural network model and does not input the high-frequency feature map set 23 to the output layer of the neural network model (i.e., only the low-frequency feature map set 24 is used to train the neural network model, and the high-frequency feature map set 23 is not used to train the neural network model), the trained neural network model will lack high-frequency information of the input data. On the other hand, if the calculation module 122 respectively inputs the high-frequency feature map set 23 and the low-frequency feature map set 24 to the output layer of the neural network model (i.e., the high-frequency feature map set 23 and the low-frequency feature map set 24 are both used to train the neural network model), it may be difficult for the neural network model to converge.

To reduce the information loss of the neural network model and accelerate the convergence of the neural network model, the calculation module 122 may first concatenate the high-frequency feature map set 23 and the low-frequency feature map set 24, and then input the concatenated input data to the output layer of the neural network model to train the neural network model.

Figure 3A:
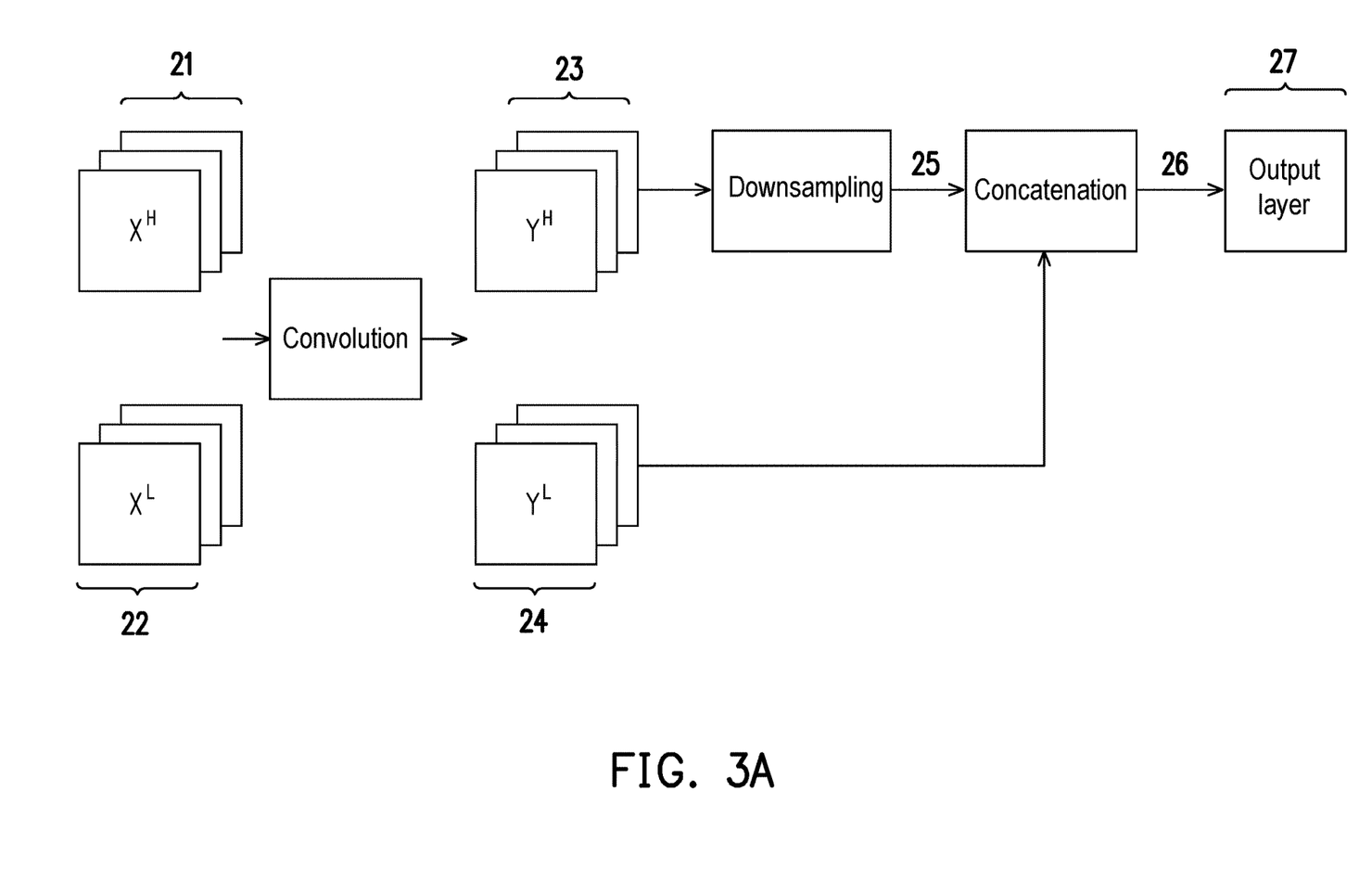
FIG. 3A is a schematic view showing generation of a concatenated data according to an embodiment of the disclosure.

FIG. 3A is a schematic view showing generation of a concatenated data 26 according to an embodiment of the disclosure. After performing convolution as shown in FIG. 2 on the high-frequency input data set 21 containing multiple high-frequency input data $X^H$ and the low-frequency input data set 22 containing multiple low-frequency input data $X^L$ to generate the high-frequency feature map set 23 and the low-frequency feature map set 24, the calculation module 122 may perform downsampling on the high-frequency feature map $Y^H$ in the high-frequency feature map set 23 to generate a high-frequency feature map set 25 containing multiple downsampled high-frequency feature maps, and the size of the downsampled high-frequency feature map matches the size of the low-frequency feature map $Y^L$ in the low-frequency feature map set 24. Then, in response to matching between the size of the downsampled high-frequency feature map and the size of the low-frequency feature map $Y^L$, the calculation module 122 may concatenate the downsampled high-frequency feature map and the low-frequency feature map $Y^L$ to generate the concatenated data 26. After generating the concatenated data 26, the calculation module 122 may input the concatenated data 26 to an output layer 27 of the neural network model so as to execute the training process of the neural network model.

Figure 3B:
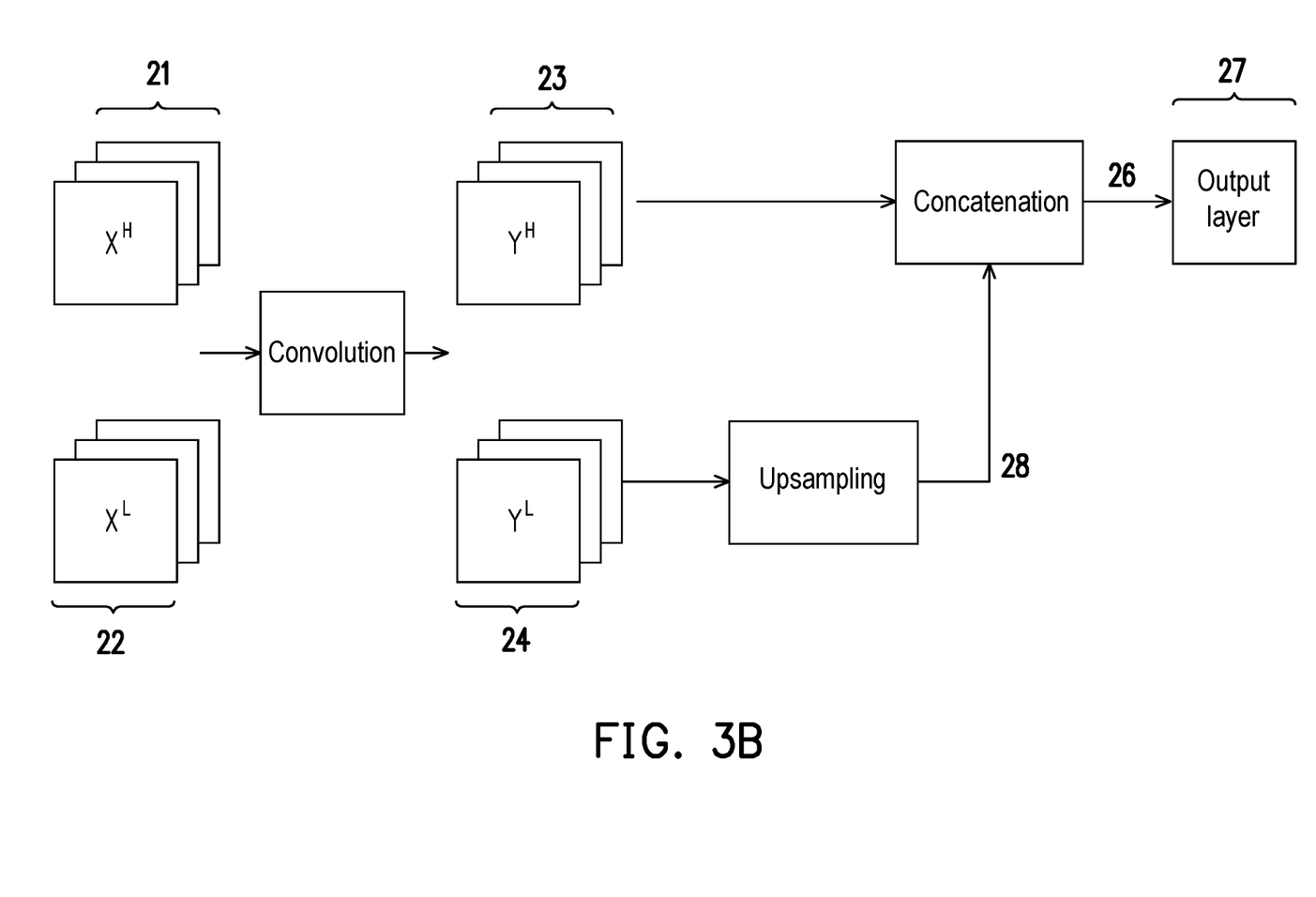
FIG. 3B is a schematic view showing generation of a concatenated data according to another embodiment of the disclosure.

FIG. 3B is a schematic view showing generation of a concatenated data 29 according to another embodiment of the disclosure. After performing convolution as shown in FIG. 2 on the high-frequency input data set 21 containing multiple high-frequency input data $X^H$ and the low-frequency input data set 22 containing multiple low-frequency input data $X^L$ to generate the high-frequency feature map set 23 and the low-frequency feature map set 24, the calculation module 122 may perform upsampling on the low-frequency feature map $Y^L$ in the low-frequency feature map set 24 to generate a low-frequency feature map set 28 containing multiple upsampled low-frequency feature maps, and the size of the upsampled low-frequency feature map matches the size of the high-frequency feature map $Y^H$ in the high-frequency feature map set 23. Then, in response to matching between the size of the upsampled low-frequency feature map and the size of the high-frequency feature map $Y^H$, the calculation module 122 may concatenate the upsampled low-frequency feature map and the high-frequency feature map $Y^H$ to generate the concatenated data 29. After generating the concatenated data 29, the calculation module 122 may input the concatenated data 29 to the output layer 27 of the neural network model so as to execute the training process of the neural network model.

Figure 4:
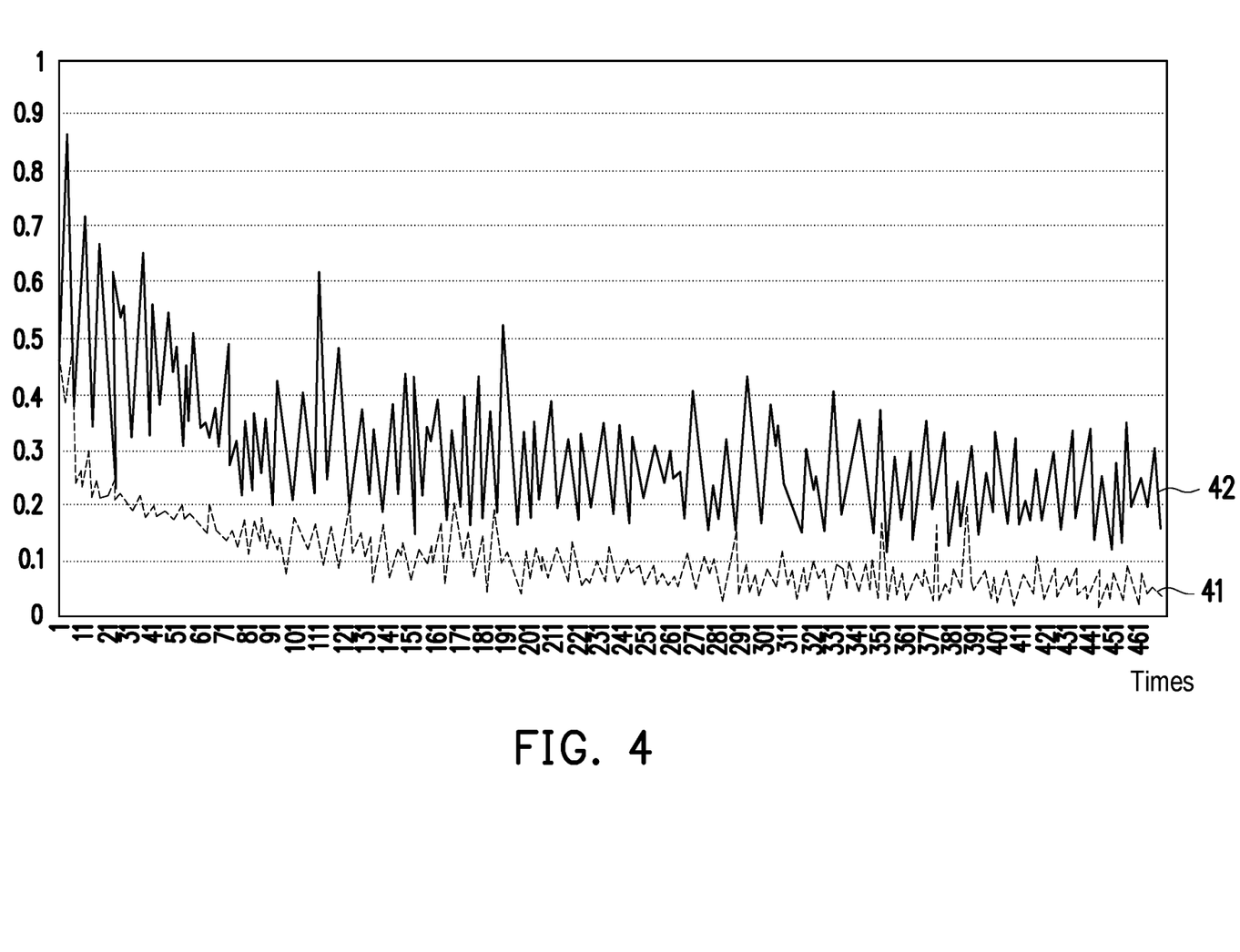
FIG. 4 is a schematic view showing convergence rates of multiple neural network models according to an embodiment of the disclosure.

FIG. 4 is a schematic view showing convergence rates of multiple neural network models according to an embodiment of the disclosure, where a line segment 41 represents the value of a loss function of the neural network model trained according to the embodiment of the disclosure, and a line segment 42 represents the value of a loss function of a neural network model trained according to a conventional method. As shown in FIG. 4, in the embodiment of the disclosure, fewer training iterations of the neural network model may be performed while achieving a lower value of the loss function.

Figure 5:
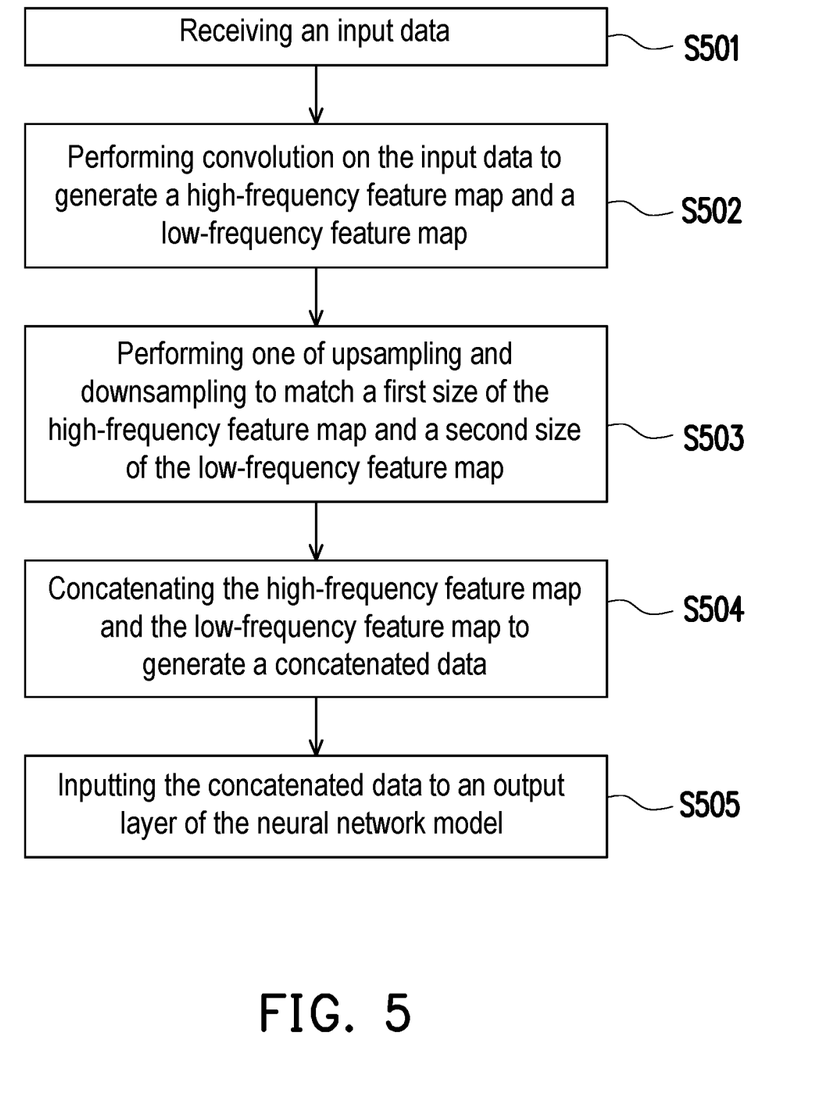
FIG. 5 is a flowchart showing a method for training or applying a neural network model according to an embodiment of the disclosure.

FIG. 5 is a flowchart showing a method for training or applying a neural network model according to an embodiment of the disclosure, and the method may be implemented by the electronic device 100 shown in FIG. 1. In step S501, an input data is received. In step S502, convolution is performed on the input data to generate a high-frequency feature map and a low-frequency feature map. In step S503, one of upsampling and downsampling is performed to match a first size of the high-frequency feature map and a second size of the low-frequency feature map. In step S504, the high-frequency feature map and the low-frequency feature map are concatenated to generate a concatenated data. In step S505, the concatenated data is inputted to an output layer of the neural network model.

In summary of the above, in the embodiments of the disclosure, multiple feature maps respectively representing features of different frequencies may be generated, so that the neural network can perform classification based on the feature maps at a lower computation capacity. In addition, the downsampling of the disclosure utilizes the low-frequency spatial information of the previous layer, so that information can be continuously transmitted to the next layer, and the training process will not be unstable due to discontinuous transmission of the information.

Furthermore, in the embodiments of the disclosure, the size of the feature maps may be adjusted through upsampling or downsampling to concatenate feature maps of different frequencies and input the concatenated data to the output layer of the neural network model to train the neural network model. Compared to using the conventional feature maps to train the neural network model, using the concatenated data disclosed in the disclosure can make the value of the loss function in the training process more stable and accelerate the convergence of the neural network model.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An electronic device for training or applying a neural network model, comprising:
   a transceiver;
   a storage medium configured to store multiple modules and the neural network model; and
   a processor configured to couple to the storage medium and the transceiver, and configure to access and execute the modules, wherein the modules comprise:
   a data collection module configured to receive an input data via the transceiver; and
   a calculation module configured to perform convolution on the input data to generate a high-frequency feature map and a low-frequency feature map, and perform one of upsampling and downsampling to match a first size of the high-frequency feature map and a second size of the low-frequency feature map, concatenate the high-frequency feature map and the low-frequency feature map to generate a concatenated data, and input the concatenated data to an output layer of the neural network model.

2. The electronic device according to claim 1, wherein the calculation module performs the downsampling on the high-frequency feature map to match the first size and the second size.

3. The electronic device according to claim 2, wherein the calculation module concatenates the high-frequency feature map and the low-frequency feature map in response to matching between the first size the second size to generate the concatenated data.

4. The electronic device according to claim 1, wherein the calculation module performs the upsampling on the low-frequency feature map to match the first size and the second size.

5. The electronic device according to claim 4, wherein the calculation module concatenates the high-frequency feature map and the low-frequency feature map in response to matching between the first size and the second size to generate the concatenated data.

6. The electronic device according to claim 1, wherein the calculation module divides the input data into a high-frequency input data and a low-frequency input data, and performs an XOR operation on a function of the high-frequency input data and a function of the upsampled low-frequency input data to generate the high-frequency feature map.

7. The electronic device according to claim 1, wherein the calculation module divides the input data into a high-frequency input data and a low-frequency input data, and performs an XOR operation on a function of the down-sampled high-frequency input data and a function of the low-frequency input data to generate the low-frequency feature map.

8. A method for training or applying a neural network model, comprising:
    receiving an input data;
    performing convolution on the input data to generate a high-frequency feature map and a low-frequency feature map;
    performing one of upsampling and downsampling to match a first size of the high-frequency feature map and a second size of the low-frequency feature map;
    concatenating the high-frequency feature map and the low-frequency feature map to generate a concatenated data; and
    inputting the concatenated data to an output layer of the neural network model.

9. The method according to claim 8, wherein the step of performing one of the upsampling and the downsampling to match the first size of the high-frequency feature map and the second size of the low-frequency feature map comprises:
    performing the downsampling on the high-frequency feature map to match the first size and the second size.

10. The method according to claim 9, wherein the step of concatenating the high-frequency feature map and the low-frequency feature map to generate the concatenated data comprises:
    concatenating the high-frequency feature map and the low-frequency feature map in response to matching between the first size and the second size to generate the concatenated data.

11. The method according to claim 8, wherein the step of performing one of the upsampling and the downsampling to match the first size of the high-frequency feature map and the second size of the low-frequency feature map comprises:
    performing the upsampling on the low-frequency feature map to match the first size and the second size.

12. The method according to claim 11, wherein the step of concatenating the high-frequency feature map and the low-frequency feature map to generate the concatenated data comprises:
    concatenating the high-frequency feature map and the low-frequency feature map in response to matching between the first size and the second size to generate the concatenated data.

13. The method according to claim 8, wherein the step of performing the convolution on the input data to generate the high-frequency feature map and the low-frequency feature map comprises:
    dividing the input data into a high-frequency input data and a low-frequency input data; and
    performing an XOR operation on a function of the high-frequency input data and a function of the upsampled low-frequency input data to generate the high-frequency feature map.

14. The method according to claim 8, wherein the step of performing the convolution on the input data to generate the high-frequency feature map and the low-frequency feature map comprises:
    dividing the input data into a high-frequency input data and a low-frequency input data; and
    performing an XOR operation on a function of the downsampled high-frequency input data and a function of the low-frequency input data to generate the low-frequency feature map.

* * * * *